United States Patent
Lawrence et al.

(10) Patent No.: US 11,200,578 B2
(45) Date of Patent: Dec. 14, 2021

(54) SYSTEM AND COMPUTER-IMPLEMENTED METHOD FOR IDENTIFYING AND BLOCKING REPETITIVE FINANCIAL TRANSACTION REQUESTS

(71) Applicant: Mastercard International Incorporated, Purchase, NY (US)

(72) Inventors: Joanne Lawrence, Wellingborough (GB); Kyle T. Williams, Wentzville, MO (US); Sharon Amy Rosano, New Canaan, CT (US)

(73) Assignee: Mastercard International Incorporated, Purchase, NY (US)

( * ) Notice: Subject to any disclaimer, the term of this patent is extended or adjusted under 35 U.S.C. 154(b) by 5 days.

(21) Appl. No.: 16/245,317

(22) Filed: Jan. 11, 2019

(65) Prior Publication Data
US 2020/0226604 A1      Jul. 16, 2020

(51) Int. Cl.
G06Q 20/34       (2012.01)
G06Q 20/40       (2012.01)

(52) U.S. Cl.
CPC ......... *G06Q 20/4016* (2013.01); *G06Q 20/34* (2013.01); *G06Q 20/405* (2013.01); *G06Q 20/407* (2013.01)

(58) Field of Classification Search
CPC .................................................. G06Q 20/4016
See application file for complete search history.

(56) References Cited

U.S. PATENT DOCUMENTS

2015/0127513 A1*   5/2015   Studnitzer .............. G06Q 40/04
                                                                    705/37
2019/0295090 A1*   9/2019   Vandezande ........... G06N 20/00

OTHER PUBLICATIONS

Huang, et al., in "CoDetect: Financial Fraud Detection with Anomaly Feature Detection," in IEEE, Apr. 2018.*

* cited by examiner

*Primary Examiner* — Olabode Akintola
*Assistant Examiner* — Brandon M Duck
(74) *Attorney, Agent, or Firm* — Hovey Williams LLP

(57) ABSTRACT

A system and computer-implemented method for identifying and blocking repetitive submissions from a fraudster or unscrupulous merchant/acquirer to a card-issuer for the same financial transaction. A communications network is monitored for financial transaction requests and responses being communicated between the fraudster or unscrupulous merchant/acquirer and the card-issuer. The requests are analyzed to identify a pattern in a subset of the requests which the card-issuer has declined. The pattern identifies the subset of the requests as repetitive submissions from the merchant/acquirer for the same financial transaction. The pattern may be based on the number of requests from the same merchant/acquirer, the same card number, the same reason code for declining the requests, the same transaction amount, and being received within a particular time period. The next submission for the same transaction is blocked from reaching the card-issuer. The total number of blocked submissions may be tracked, and the merchant/acquirer may be penalized if they become excessive.

14 Claims, 2 Drawing Sheets

Figure 1:
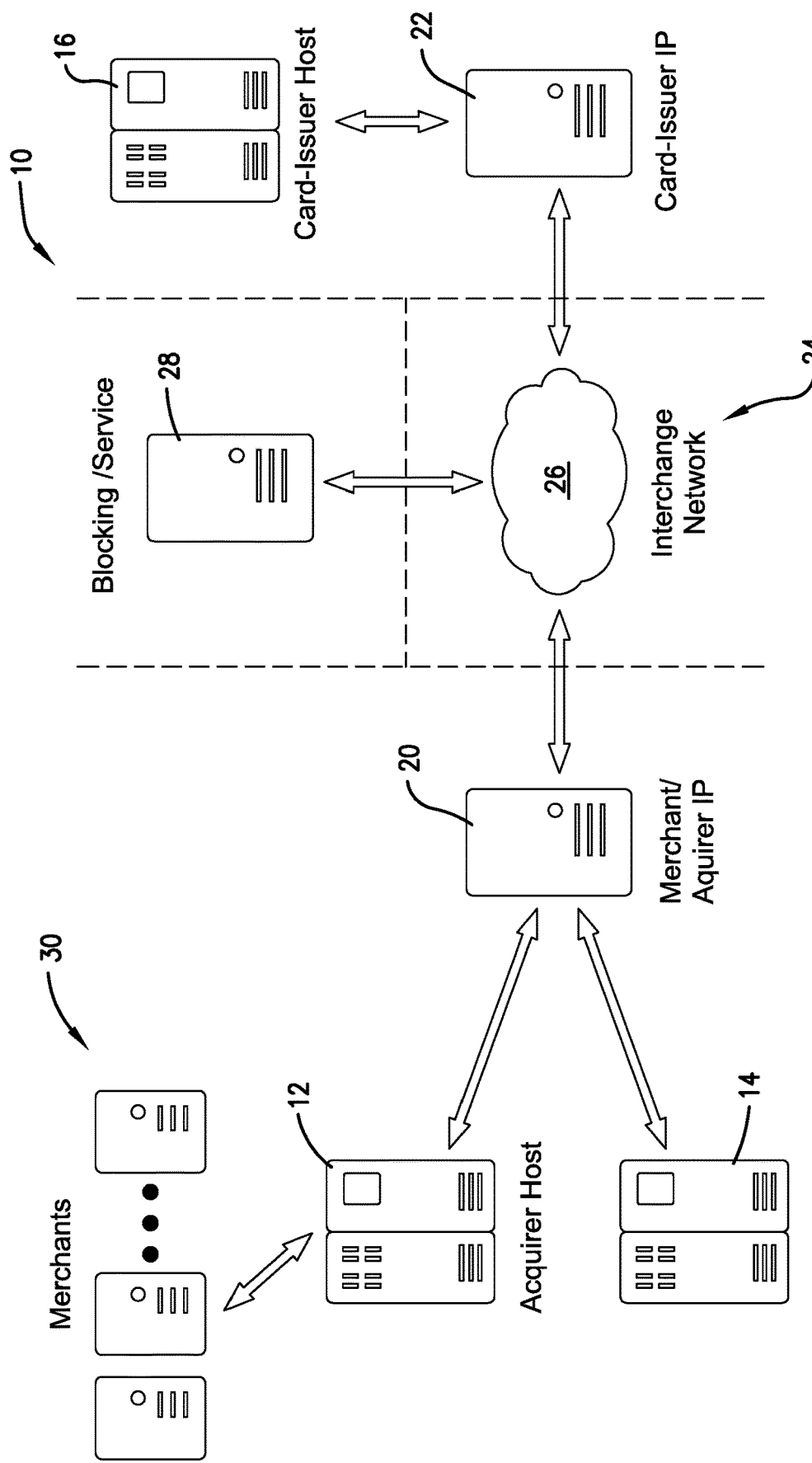

SYSTEM AND COMPUTER-IMPLEMENTED METHOD FOR IDENTIFYING AND BLOCKING REPETITIVE FINANCIAL TRANSACTION REQUESTS

FIELD

The present invention relates to systems and methods for facilitating financial transactions, and more particularly, embodiments concern a system and computer-implemented method for identifying and blocking repetitive financial authorization and/or clearing transaction requests from a fraudster or unscrupulous merchant or acquirer to a card-issuer for the same card-based financial transaction.

BACKGROUND

Repetitive authorization requests occur when fraudster or unscrupulous merchants or acquirers repeatedly submit authorization and/or clearing requests for the same financial transactions after having been initially declined. When this occurs, it can overwhelm the processing systems of the card-issuers, which can eventually result in undesired approvals of the financial transactions. For example, some card-issuers may give "Stand-In" authority to their interchange networks to approve financial transaction requests when the card-issuers are overwhelmed. So some fraudster or unscrupulous merchants or acquirers may launch attacks on card-issuers' networks by making large numbers of repetitive authorization requests in attempts to overwhelm the networks and force through bad authorizations. For example, fraudster or unscrupulous acquirers for card-not-present (CNP) merchants sometimes submit very large volumes of repetitive authorization requests, sometimes dozens or even hundreds of times after the initial transactions have been declined by the card-issuers. These repetitive requests can present a substantial risk to the interchange networks' payments network. When large volumes of repetitive authorization requests occur, the potential effect is traffic overload (excess congestion) of the authorization response systems of the interchange networks and the card-issuers, which can result in network failure in terms of lost customer service, brand reputation, and positive cardholder experience. Further, card-issuers incur expenses for authorization requests, and repetitive authorization requests, whether made intentionally for the purpose of fraud or accidentally due to technical problems, can lead to card-issuers paying excessive network authorization fees as well as the costs of any bad transactions that are approved.

This background discussion is intended to provide information related to the present invention which is not necessarily prior art.

SUMMARY

Embodiments address the above-described and other problems by providing a system and computer-implemented method for identifying and blocking repetitive financial authorization and/or clearing transaction requests from a fraudster or unscrupulous merchant or acquirer to a card-issuer for the same CNP or other card-based financial transaction. In particular, embodiments advantageously prevent unnecessary network congestion and Stand-In, and protect the integrity of the interchange network by facilitating transaction processing while protecting against fraud.

In a first embodiment, a computer-implemented method is provided for improving the functioning of a computer for identifying and blocking repetitive submissions from a source (e.g., a fraudster or unscrupulous merchant or acquirer) to a card-issuer for the same financial transaction. The computer may include an electronic processor, and the computer-implemented method may comprise the following steps performed by the electronic processor. A communications network may be monitored for a plurality of financial transaction requests and responses being communicated between the source and the card-issuer. The plurality of financial transaction requests may be analyzed to identify a pattern in a subset of the plurality of financial transaction requests which the card-issuer has declined, wherein the pattern identifies the subset of the plurality of financial transaction requests as repetitive submissions from the source to the card-issuer for the same financial transaction. Based on the pattern, a next submission for the same financial transaction from the source may be blocked from reaching the card-issuer.

In a second embodiment, a system is provided for identifying and blocking repetitive submissions from a source to a card-issuer for the same financial transaction. The system may comprise a communications network and a blocking service. The communications network may carry communications between the source and the card-issuer. The blocking service may include an electronic processor configured to perform the following actions. The communications network may be monitored for a plurality of financial transaction requests and responses being communicated between the source and the card-issuer. The plurality of financial transaction requests may be analyzed to identify a pattern in a subset of the plurality of financial transaction requests which the card-issuer has declined, wherein the pattern identifies the subset of the plurality of financial transaction requests as repetitive submissions from the source to the card-issuer for the same financial transaction. Based on the pattern, a next submission for the same financial transaction from the source may be blocked from reaching the card-issuer.

The plurality of financial transaction requests may be authorization requests and/or clearance requests. The pattern may be based on the subset of the plurality of financial transaction requests having a particular number of financial transaction requests with a same source, a same card number, and/or a same transaction amount, and being received within a particular time period. The pattern may be further based on the subset of the plurality of financial transaction requests having a same reason code given by the card-issuer for declining the subset of the plurality of financial transaction requests. The particular number of financial transaction requests may be between four and seven, and/or may be determined by the card-issuer. The particular time period may be between one hour and twenty-four hours, and/or may be determined by the card-issuer. The same transaction amount may include an amount which is within one percent of an average transaction amount for the subset of the plurality of financial transaction. The computer-implemented method and/or system functionality may further include tracking a total number of blocked submissions for the same financial transaction, and imposing a penalty which may include warning the source if the total number of blocked submissions for the same transaction exceeds a pre-established maximum number, and/or billing the source if the source continues submitting financial transaction requests for the same financial transaction.

This summary is not intended to identify essential features of the present invention, and is not intended to be used to limit the scope of the claims. These and other aspects of the present invention are described below in greater detail.

DRAWINGS

Figure 2:
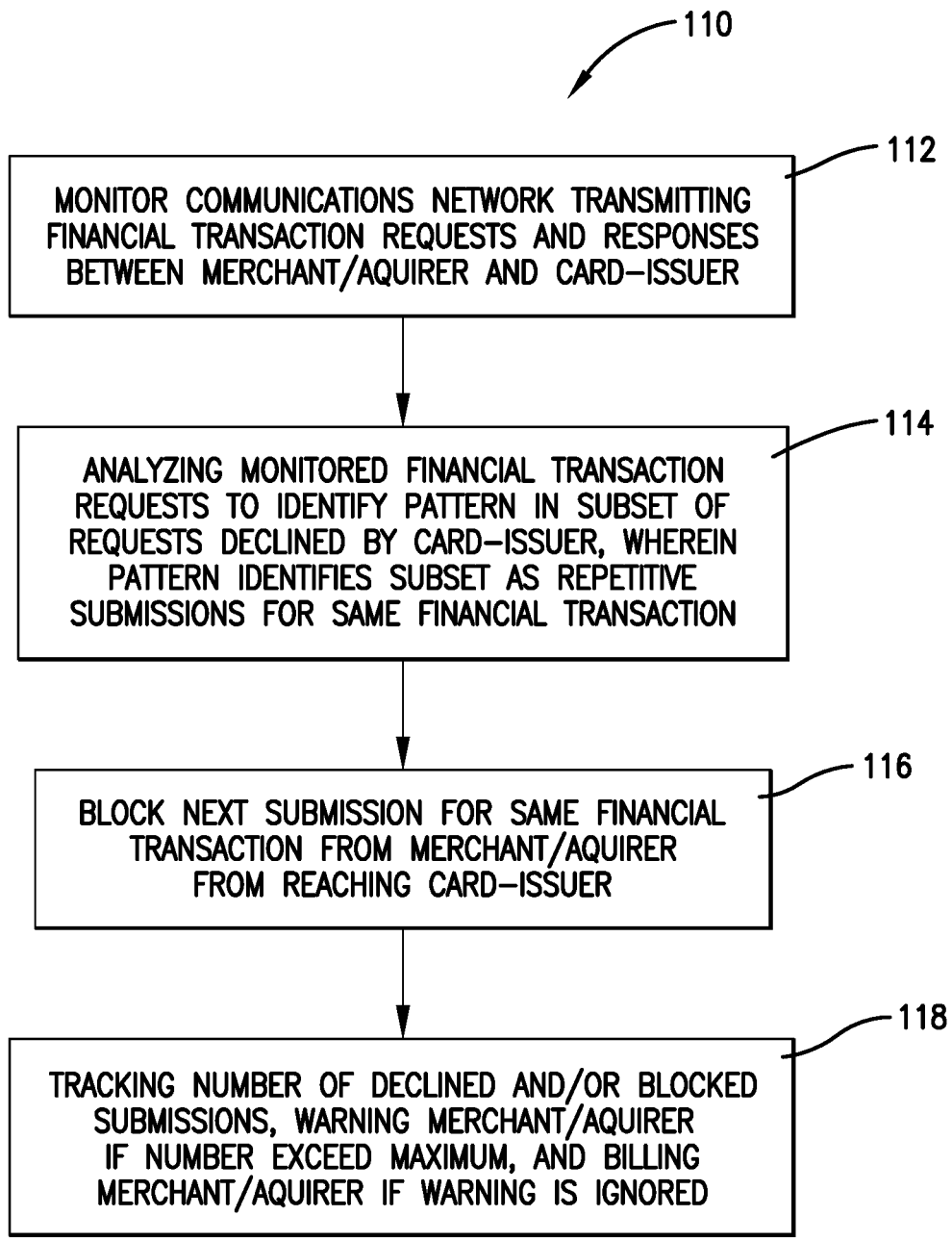

Embodiments of the present invention are described in detail below with reference to the attached drawing figures, wherein:

FIG. 1 is a diagram of an embodiment of a system for identifying and blocking repetitive authorization requests from a fraudster or unscrupulous merchant or an acquirer to a card-issuer for the same financial transaction; and FIG. 2 is a flowchart of steps in an embodiment of a computer-implemented method for identifying and blocking repetitive authorization requests from a fraudster or unscrupulous merchant or an acquirer to a card-issuer for the same financial transaction.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments provide a system and computer-implemented method for identifying and blocking repetitive financial authorization and/or clearing transaction requests from a source (e.g., a fraudster or unscrupulous merchant or an acquirer) to a card-issuer for the same CNP or other card-based financial transaction. Embodiments advantageously prevent unnecessary network congestion and Stand-In, and protect the integrity of the interchange network by facilitating transaction processing while protecting against fraud.

In more detail, embodiments may detect in real-time a pattern of CNP transaction requests declined by the card-issuer, and then, based on the pattern, identify and block the next CNP transaction request on behalf of the card-issuer. The pattern may be based on the subset of financial transactions having at least some of the following criteria: repetitive requests having the same merchant/acquirer, the same card number, the same reason code given by the card-issuer for declining the requests, the same or similar (e.g., within five percent (5%), or within one percent (1%)) of the transaction amount, and the number of requests (e.g., between four (4) and seven (7) that fit the pattern within a particular time period (e.g., twenty-four (24) hours). In one implementation, when a maximum number (e.g., four (4)) of repetitive CNP transaction requests are submitted within a particular period (e.g., twenty-four (24) hours) for the same permanent account number (PAN), acquirer interbank card association (ICA) number, and merchant identification (ID) and/or merchant name that a card-issuer has declined for any of one or more reason codes such as 05 (Do Not Honor), 12 (Invalid Transaction), or 57 (Transactions Not Permitted to Issuer/Cardholder), then the interchange network may block additional requests for the same CNP transaction. Requests blocked by the interchange network may be declined with a reason code of 05 (Do Not Honor), and an Advice Code may be communicated with the declination message to the merchant/acquirer. In one implementation, the interchange network may not block all requests from offending merchants/acquirers, just particular repeated requests that fit the pattern to be blocked. In another implementation, merchants/acquirers who repeatedly abuse the process may be at least temporarily prevented from submitting any transaction requests.

Recognizing that fraudster or unscrupulous merchants may attempt to manipulate this process by modifying subsequent requests after being blocked, by, e.g., changing the transaction amount from $100.00 to $99.99, embodiments may employ machine learning to identify such manipulations and modify the pattern accordingly. For example, if an initial set of repetitive requests is blocked, and a second set of repetitive requests is received having only a recognizably superficial difference from the first set of requests, then the second set may be blocked even before the maximum number or time period thresholds are reached, and third and subsequent sets of requests may be blocked even faster as the machine learning learns to recognize the manipulation strategy.

Various implementations may be flexible with regard to one or more of the criteria for identifying repetitive authorization requests. For example, it may be desirable to be flexible with regard to the maximum number of requests based on geographic region, in which three (3) or four (4) may be the maximum for some markets and six (6) or seven (7) may be the maximum for other markets. In another example, it may be desirable to be flexible with regard to the maximum number of requests based on the month or season of the year, in which three (3) or four (4) may be the maximum for months or seasons with less purchasing activity and six (6) or seven (7) may be the maximum for months or seasons with more purchasing activity. In one implementation, card-issuers may be allowed to set their own thresholds for identifying repetitive authorization requests based on their own needs and/or experiences.

fraudster or unscrupulous merchant/acquirers who are blocked from or otherwise cannot obtain authorization with repeated authorization requests may attempt to bypass the authorization process by employing the same strategy of repetitive requests through the clearing, or settlement, process. So embodiments may additionally or alternatively identify patterns associated with repeated clearing requests, and block further repetitions of such requests. In one implementation, during clearing, the interchange network may reject the transactions with a code that matches the authorization advice code.

Reporting for merchants/acquirers and card-issuers may identify the number of transactions declined by the blocking service of the interchange network, and may impose a penalty on merchants/acquirers that are submitting excessive repetitive transaction requests. Imposing a penalty may include issuing a warning, blocking transactions, and/or billing a monetary amount. Embodiments may block requests from merchants to card-issuers and/or from acquirers to card-issuers, but cannot block requests from merchants to acquirers. However, acquirers that are found to be ignoring warnings or otherwise facilitating the repetitive requests may be billed based on the total number of repetitive requests they submit on behalf of merchants. Merchants with an established history of abusive repetitive request tactics may be added to a database that tracks such merchant behavior.

Referring to FIG. 1, an embodiment of a system 10 is shown for identifying and blocking repetitive authorization and/or clearing transaction requests from a source (e.g., a fraudster or unscrupulous merchant or an acquirer) to a card-issuer for the same financial transaction. The system 10 may include Acquirer and/or a Merchant/Acquirer hosts 12,14 and a Card-Issuer host 16; a Merchant/Acquirer interface processor (IP) 20 and a Card-Issuer IP 22; an Interchange Network 24 including a multiprotocol label switching (MPLS) or other communications network 26; and a Blocking Service 28.

The Acquirer and/or a Merchant/Acquirer hosts 12,14 may be configured to generate financial transaction requests, such as authorization and/or clearing requests, for financial transactions from one or more Merchants 30. The Merchant/Acquirer IP 20 may be configured to receive the generated requests from the hosts 12,14 and forward the requests to the Card-Issuer IP 22 via the Interchange Network 24, and to receive responses (e.g., approvals and declinations) from the Card-Issuer IP 22 via the Interchange Network 24 and forward the responses to the hosts 12,14. The Card-Issuer IP 22 may be configured to receive the requests from the Merchant/Acquirer IP 20 and forward the requests to the Card-Issuer host 16. The Card-Issuer host 16 may be configured to receive the requests and generate corresponding responses, and send the responses to the Card-Issuer IP 22. The Card-Issuer IP 22 may be configured to receive the generated responses from the host 16 and forward the responses to the Acquirer/Merchant IP 20 via the Interchange Network 24. The Acquirer/Merchant IP 20 may be configured to receive the responses from the Card-Issuer IP 22 and forward the responses to the hosts 12,14. The Interchange Network 26 may be configured to switch communications between the Merchant/Acquirer IP 20 and the Card-Issuer IP 22 over the communications network 26.

The Merchants 30 may be individual sellers of goods or services seeking payment from customers using payment cards. The IPs 20,22 may be MIPs, which are direct connections to the Mastercard interchange network, and/or VAPs, which are direct connections to the Visa interchange network, which provide low cost, high-speed connections directly to the Interchange Network 24. When the Merchant and/or Merchant/Acquirer host 12,14 receives a transaction request from a Merchant 30, the host 12,14 may determine the type of payment card (e.g., Visa, Mastercard, AMEX, etc.), and based on the determined type of payment card, the host 12,14 may send the transaction request to the appropriate IP 20 and/or Interchange Network 24. The communications network 26 may be an MPLS network employing a data-carrying technique for high-performance telecommunications networks, which directs data from one network node to the next based on short path labels rather than long network addresses, thereby avoiding complex lookups in a routing table.

The Blocking Service 28 may be part of the Interchange Network 24 or may be a third-party service provided via or otherwise in cooperation with the Interchange Network 24. Referring also to FIG. 2, the Blocking Service 28 may include a computer having an electronic processor configured to perform the following actions. The communications network 26 may be monitored for a plurality of financial transaction requests and responses being communicated between the Merchant/Acquirer IP 20 and the Card-Issuer IP 22, as shown in 112. The plurality of financial transaction requests may be analyzed to identify a pattern in a subset of the plurality of financial transaction requests which the Card-Issuer host 16 has declined, wherein the pattern identifies the subset of the plurality of financial transaction requests as repetitive submissions from the Merchant/Acquirer IP 20 to the Card-Issuer IP 22 for the same financial transaction, as shown in 114. Based on the pattern, a next submission for the same financial transaction from the Merchant/Acquirer IP 20 may be identified and blocked from reaching the Card-Issuer IP 22, as shown in 116.

The system 10 may include more, fewer, or alternative components and/or perform more, fewer, or alternative actions, including those discussed elsewhere herein, and particularly those discussed in the following section describing the computer-implemented method.

Referring again to FIG. 2, an embodiment of a computer-implemented method 110 is shown for improving the functioning of a computer for identifying and blocking repetitive financial authorization and/or clearing transaction requests from a source (e.g., a fraudster or unscrupulous merchant or an acquirer) to a card-issuer for the same financial transaction. The computer may have an electronic processing element which performs at least some of the steps of the method. The computer-implemented method 110 may be a corollary to the functionality of the above-described system 10, and may be similarly implemented using the various components of the system 10 within the above-described exemplary operating environment. Broadly, the computer-implemented method 110 may comprise the following steps performed by the electronic processor.

A communications network 26 may be monitored for a plurality of financial transaction requests and responses being communicated between a Merchant/Acquirer IP 20 and a Card-Issuer IP 22, as shown in 112. The financial transactions may be CNP transactions, and the financial transaction requests may be authorization requests and/or clearance, or settlement, requests.

The plurality of financial transaction requests may be analyzed to identify a pattern in a subset of the financial transaction requests which a Card-Issuer host 16 has declined, wherein the pattern identifies the subset of the financial transaction requests as repetitive submissions from the Merchant/Acquirer IP 20 to the Card-Issuer IP 22 for the same financial transaction, as shown in 114. The pattern may be based on the subset of the financial transaction requests having a particular number of financial transaction requests from a same merchant/acquirer, a same card number, and/or a same transaction amount, and/or received within a particular time period. In one implementation, all of the foregoing may be used to determine the pattern. In one implementation, the Blocking Service 28 may also analyze whether a same reason code is given by the card-issuer for declining the subset of financial transactions. The particular number of financial transaction requests may be between three (3) or four (4) and seven (7), and/or the particular number of financial transaction requests may be determined by the card-issuer. The particular time period may be between one (1) hour and twenty-four (24) hours, and/or may be the particular time period is determined by the card-issuer. The same transaction amount may include a transaction amount which is within five percent (5%) or within one percent (1%) of a prior or average transaction amount.

Based on the pattern, a next submission for the same financial transaction from the Merchant/Acquirer IP 20 may be identified and blocked from reaching the Card-Issuer IP 22, as shown in 116. Blocking the financial transaction request may include sending a reason code for the block to the Merchant/Acquirer IP 20.

In one implementation, the computer-implemented method 110 may further include imposing a penalty on merchants and/or acquirers who abuse the submission process. For example, a total number of declined and/or blocked financial transaction requests may be tracked, the merchant and/or acquirer may be warned if the total number of declined and/or blocked financial transaction requests exceeds a pre-established maximum number (e.g., between ten (10) and twenty (20) within a pre-established time period (e.g., between one (1) hour and twenty-four (24) hours), and the merchant/acquirer may be billed an appropriate compensatory or punitive amount if the merchant/acquirer ignores the warning and continues submitting financial transaction requests for the same financial transaction, as shown in 118.

The computer-implemented method 110 may include more, fewer, or alternative actions, including those discussed elsewhere herein.

Any actions, functions, steps, and the like recited herein may be performed in the order shown in the figures and/or described above, or may be performed in a different order. Furthermore, some steps may be performed concurrently as opposed to sequentially. Although the computer-implemented method is described above, for the purpose of illustration, as being executed by an exemplary system and/or exemplary physical elements, it will be understood that the performance of any one or more of such actions may be differently distributed without departing from the spirit of the present invention.

A computer-readable medium comprising a non-transitory medium may include an executable computer program stored thereon and for instructing one or more processing elements to perform some or all of the steps described herein, including some or all of the steps of the computer-implemented method. The computer program stored on the computer-readable medium may instruct the processing element and/or other components of the system to perform additional, fewer, or alternative actions, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processing element," "processor," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only, and are thus not intended to limit in any way the definition and/or meaning of the term "processing element." In particular, "a processing element" may include one or more processing elements individually or collectively performing the described functions. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are exemplary only, and are thus not limiting as to the types of memory usable for storage of a computer program.

The terms "computer," "computing device," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "communications network" and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short range communications protocols.

The term "communications element" and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory element," "data storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

The invention claimed is:

1. A system for identifying and blocking repetitive submissions from a merchant/acquirer to a card-issuer for a same financial transaction, the system comprising:

an interchange network carrying electronic communications including financial transaction requests and responses between the merchant/acquirer and the card-issuer; and an electronic processor connected to the interchange network and implementing a transaction blocking service wherein the electronic processor—
  monitors the interchange network for a plurality of financial transaction requests and responses being communicated between the merchant/acquirer and the card-issuer,
  analyzes the plurality of financial transaction requests to identify a pattern in a subset of the plurality of financial transaction requests which the card-issuer has declined, wherein the pattern identifies the subset of the plurality of financial transaction requests as repetitive submissions from the merchant/acquirer to the card-issuer for the same financial transaction,
  based on the pattern, identifies and automatically blocks a next submission for the same financial transaction from the merchant/acquirer from reaching the card-issuer,
  tracks a total number of blocked submissions for the same financial transaction, and
  bills the merchant/acquirer if the total number of blocked submissions exceeds a pre-established maximum number of blocked submissions for the same financial transaction.

2. The system of claim 1, wherein the pattern is based on the subset of the plurality of financial transaction requests having a particular number of financial transaction requests with a same merchant/acquirer, a same card number, and a same transaction amount, and being received within a particular time period.

3. The system of claim 2, wherein the pattern is further based on the subset of the plurality of financial transaction requests having a same reason code given by the card-issuer for declining the subset of the plurality of financial transaction requests.

4. The system of claim 2, wherein the particular number of financial transaction requests is between four and seven.

5. The system of claim 2, wherein the particular number of financial transaction requests is determined by the card-issuer.

6. The system of claim 2, wherein the particular time period is determined by the card-issuer.

7. The system of claim 2, wherein the same transaction amount includes a transaction amount which is within one percent of an average transaction amount for the subset of the plurality of financial transaction requests.

8. The system of claim 1, wherein the plurality of financial transaction requests are authorization requests.

9. The system of claim 1, wherein the plurality of financial transaction requests are clearance requests.

10. The system of claim 1, wherein the electronic processor imposes a penalty on the merchant/acquirer if the total number of blocked submissions for the same financial transaction exceeds the pre-established maximum number of blocked submissions for the same financial transaction.

11. A system for identifying and blocking repetitive submissions from a merchant/acquirer to a card-issuer for a same card-not present financial transaction, the system comprising:
  an interchange network carrying electronic communications including financial transaction requests and responses between the merchant/acquirer and the card-issuer; and
  an electronic processor connected to the interchange network and implementing a transaction blocking service wherein the electronic processor—
    monitors the interchange network for a plurality of financial transaction requests and responses being communicated between the merchant/acquirer and the card-issuer,
    analyzes the plurality of financial transaction requests to identify a pattern in a subset of the plurality of financial transaction requests which the card-issuer has declined, wherein the pattern is based on the subset of the plurality of financial transaction requests including between four and seven financial transaction requests with a same merchant/acquirer, a same card number, a same transaction amount, and a same reason code given by the card-issuer for declining the subset of the plurality of financial transaction requests and being received within a same twenty-four hour time period, and wherein the pattern identifies the subset of the plurality of financial transaction requests as repetitive submissions from the merchant/acquirer to the card-issuer for the same card-not present financial transaction,
    based on the pattern, identifies and automatically blocks a next submission for the same card-not present financial transaction from the merchant/acquirer from reaching the card-issuer,
    tracks a total number of blocked submissions for the same financial transaction, and
    bills the merchant/acquirer if the total number of blocked submissions exceeds a pre-established maximum number of blocked submissions and continues submitting financial transaction requests for the same card-not present financial transaction.

12. The system of claim 11, wherein the plurality of financial transaction requests are authorization requests.

13. The system of claim 11, wherein the plurality of financial transaction requests are clearance requests.

14. The system of claim 11, wherein the electronic processor imposes a penalty on the merchant/acquirer if the total number of blocked submissions for the same card-not present financial transaction exceeds the pre-established maximum number of blocked submissions for the same card-not present financial transaction.

* * * * *